United States Patent [19]

Lipets et al.

[11] 4,243,096

[45] Jan. 6, 1981

[54] MULTIPASS CORROSION-PROOF AIR HEATER

[76] Inventors: Adolf U. Lipets, prospekt Lenina, 150a, kv. 38; Boleslav M. Krasnov, ulitsa Pionerskaya, 18, kv. 35; Ivan A. Sotnikov, ulitsa Mashinostroitelei, 32, kv. 114, all of Podolsk Moskovskoi oblasti; Alexei Z. Fedosov, ulitsa Burakova, 7, korpus 3, kv. 18, Moscow; Vadim B. Galuskin, Juzhny proezd, 9, kv. 58, Podolsk Moskovskoi oblasti; Jury I. Lafa, ulitsa Mashinostroitelei, 28b, kv. 58, Podolsk Moskovskoi oblasti; Boris I. Alexandrov, ulitsa Udarnikov, 8, kv. 19, Podolsk Moskovskoi oblasti; Gennady V. Gromov, ulitsa Filippova, 2, kv. 73, Podolsk Moskovskoi oblasti, all of U.S.S.R.

[21] Appl. No.: 28,394

[22] Filed: Apr. 9, 1979

[51] Int. Cl.³ .............................................. F28F 19/00
[52] U.S. Cl. .............................. 165/134 DP; 122/1 A; 122/DIG. 1; 122/DIG. 2
[58] Field of Search ................. 122/1 R, 1 A, DIG. 1, 122/DIG. 2; 165/134 DP, 111, 113

[56] References Cited

U.S. PATENT DOCUMENTS

| 2,363,870 | 11/1944 | Karlsson et al. | 165/134 DP |
| 2,665,840 | 1/1954 | Powell | 165/134 DP |
| 3,194,214 | 7/1965 | Frendberg | 165/134 DP |

FOREIGN PATENT DOCUMENTS 2701728  9/1978  Fed. Rep. of Germany .... 165/134 DP

Primary Examiner—Edward G. Favors
Attorney, Agent, or Firm—Steinberg & Raskin

[57] ABSTRACT

In an air heater, mixers of hot and cold air are built into circulating air ducts between the passes of that portion of the air heater which is exposed to the danger of corrosion. Said mixers are provided in the form of tubes perforated lengthwise and located frontally in the respective pass. Headers serving the mixers are connected to cold air feeding ducts.

Perforations the tubes of each mixer are provided with serve to direct jets of cold air at right angles to the flow of hot air.

The tubes of the mixer are blanked off at the opposite ends of the adjacent tubes while the open ends of these tubes are connected to different cold air headers. Used as the tubes of a mixer can be a bunch of frontal tubes in the respective passes of the air heater.

The air heater disclosed offers protection against corrosion by heating a mixture of cold and hot air to a minimum temperature, and said protection is achieved in a compact light-weight apparatus requiring minimum labor for its fabrication.

4 Claims, 5 Drawing Figures

MULTIPASS CORROSIONPROOF AIR HEATER

The present invention relates to multipass air heaters and has a specific reference to boilers used in power generation.

To be more precise, the present invention relates to tubular air heaters operated in conjunction with steam boilers, furnaces and other equipment wherein aggressive and corrosion-provoking hot uptake gases are used to heat cold air. In such air heaters, commonly of the multipass type on the airside, initial passes introduced whereinto is cold air are subject to rapid corrosion. There are known multipass air heaters, the so called cascade air heaters, wherein the cold end is protected against corrosion through the preheating of a fraction of the cold air admitted into the first pass of the air heater while the rest of cold air is gradually fed stagewise between the passes of the air heater, being admitted into circulating air ducts interconnecting the successive air passes.

The intermixing of hot and cold air is effected in the known cascade air heaters either by connecting an air feeding duct directly to an air circulating one without any special contrivances or by a recourse to the conventional glove type mixers.

Cascade air heaters are rather effective, for their corrosion resistance is guaranteed in principle while the total preheating of the entire air is of a low order and the means of preheating air is a compact one. Yet, reliable protection against corrosion and high thermal efficiency of the cascade air heater are affected by the performance of the mixers and can be nullified if it is poor. In a multipass air heater emplying more than one stage whereat cold air inflows are admitted, operational reliability depends on proper functioning of all the mixers without exclusion.

It is known that to provide for adequate intermixing is a formidable problem. To cope therewith, the known cascade air heaters operate at air mixture temperatures higher than the optimum one. This is a factor reducing the thermal efficiency of the air heater and a drawback of the known cascade air heaters. Another drawback also associated with mixers is the necessity to employ long air circulating ducts in order to provide for a path for the intermixing of hot and cold air of the requisite length.

It is an object of the present invention to provide a multipass corrosionproof air heater wherein reliable protection against corrosion is assured under the conditions of minimum temperature of the air mixture conducive to low weight and small size of the heating surfaces.

Another object of the present invention is to provide a multipass corrosionproof air heater employing circulating air ducts of minimum size.

A further object of the present invention is to provide a multipass corrosionproof air heater which incorporates mixers requiring comparatively little metal and labour for their fabrication.

Said and other objects are attained according to the invention by disclosing a multipass corrosionproof air heater incorporating banks of heating tubes arranged in separate passes series-connected on the airside, some of said passes being located inside a corrosive zone; air circulating ducts connecting the adjacent passes to each other; cold air feeding ducts one whereof contains a means of preheating a fraction of the cold air introduced into the first pass while the rest of said air feeding ducts are connected, by way of mixers of cold and hot air, to the air circulating ducts located in that portion of the air heater which operates in the corrosive zone and serving to connect said portion to the rest of passes; said air heater is characterized in that said mixers of cold and hot air are built into said air circulating ducts and comprise each an array of parallel tubes perforated lengthwise, fitted along the front of the heating tubes forming the respective pass and connected to cold air headers communicating with the air feeding ducts.

Such a plan allows to achieve high efficiency of the air heater and assures reliable protection thereof against corrosion while keeping the size and weight at a minimum.

In one embodiment of the present invention there is disclosed a multipass corrosionproof air heater characterized in that the perforations are provided in tubes to direct jets of cold air at right angles to the flow of hot air.

This arrangement enables the mixer to have just one or two rows of perforated tubes and allows the size of air circulating ducts to be reduced to a minimum.

According to another embodiment of the invention, there is disclosed a multipass corrosionproof air heater characterized in that the adjacent perforated tubes of each mixer are blanked off at opposite ends while the other ends thereof are connected to different cold air headers.

Such a layout provides for a more uniform than ever before distribution of the temperatures of hot and cold air along the height and consequently allows to reduce the requisite temperature of the air mixture by a considerable amount.

According to a further embodiment of the invention, there is disclosed a multipass corrosionproof air heater characterized in that a bunch of frontal heating tubes of a respective pass of the air heater is used a the tubes of the mixer.

This solution simplifies the fabrication of the air heater, for the mixer can be made as a portion of the heating surface.

The present invention will now be described with reference to a specific embodiment thereof taken in conjunction with the accompanying drawings in which.

Figure 2:
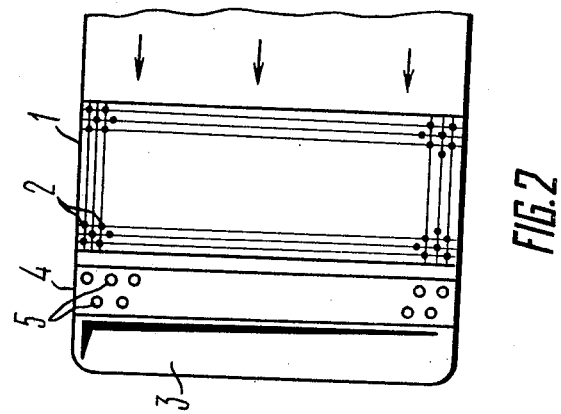
FIG. 2 is a sectional elevation of the first pass in the air heater illustrated in FIG. 1.

Exemplified in the description which follows is a triplepass corrosionproof cascade air heater with one stage of cold air inflow, although there can be more one such stage. A first pass 1, by analogy with the rest of passes, contains a bank of heating tubes 2 along the front whereof a mixer 4 of hot and cold air is arranged in an air circulating duct 3. The mixer 4 is an array of parallel tubes 5 perforated lengthwise and connected to a cold air heater 6 communicating, in its turn, an air feeding duct 7. The air heater is provided with another air feeding duct 8 admitted wherethrough is only a fraction of cold air. This duct contains a means 9 of preheating the air. Inducing the flow of cold air is a blower 10. The air heater is further provided with a second and third passes, shown at 11 and 12, respectively, at the hot end and with an air circulating duct 13 interconnecting said passes. Though depicted is just one header 6, the air heater may feature two headers, an upper and a lower one. By locating the mixer as disclosed and giving the mixer the disclosed construction it is feasible to reduce its overall dimensions to a minimum—just one or two rows of tubes—while providing for an effective mixing of cold and hot air since the flow of hot air passing through the bank of heating tubes 2 enters a similar bank of the tubes 5 forming the mixer 4 within the limits of the same frontal area.

Figure 3:
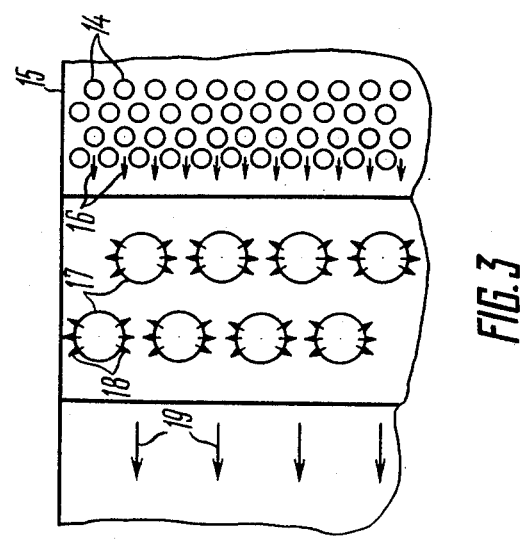
FIG. 3 is a view illustrating the way a mixer is located in the air heater of FIG. 1 and the arrangement of perforations in the tubes of the mixer.

Another factor enhancing the effect of intermixing is the way the perforations are arranged in the tubes 5 of the mixer 4: the jets of cold air are issued at right angles to the flow of hot air. This is illustrated in FIG. 3 in which heating tubes 14 of a first pass 15 can be seen along with a stream 16 of hot air leaving said pass as well as tubes of a mixer 17 with jets 18 of cold air outflowing through the perforations. Since in a stream 19 outflowing from the mixer the hot and cold air are thoroughly intermixed, it is possible to maintain the temperature of the mixture at a point close to the minimum temperature required to provide for the protection of the second pass of the air heater against corrosion. In this way high thermal efficiency of the air heater is combined with reliable protection thereof against corrosion.

Figure 4:
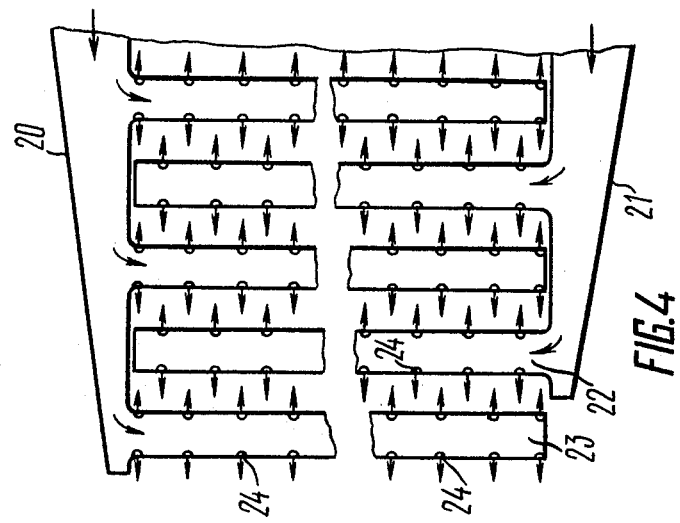
FIG. 4 is a view of a mixer illustrating the improved way of connecting the tubes of the mixer to cold air headers.

To prevent a non-uniform distribution of the temperature of the mixture of air along the tubes of the mixer which is, generally speaking, a possible occurence since the flow of cold air gradually diminishes as the air is issuing out of said tubes along the length thereof, it is preferred in the present invention to blank off one end of each of the adjacent tubes of the mixer while the other ends are connected to different cold air headers as this is illustrated in FIG. 4. It will be noted that two headers 20 and 21 feed cold air in an array of parallel tubes 22 and 23 pierced by perforations 24. The adjacent tubes 22 and 23 of the mixer are blanked off at their opposite ends whereas the other ends thereof are connected, as shown in FIG. 4, to the different headers 20 and 21.

By virtue of arranging the mixer on the above line, the curves of the rates of air flows along the adjacent tubes 22 and 23 are quite identical and complementing each other so that the total rates of flows at any cross section along the length remain the same and so, consequently, remain the temperatures of the mixture along the tubles of the mixer. This fact allows a further reduction in the temperature of the mixture, bringing it more closer to the minimum temperature afording protection of the second pass of the air heater against corrosion.

Figure 5:
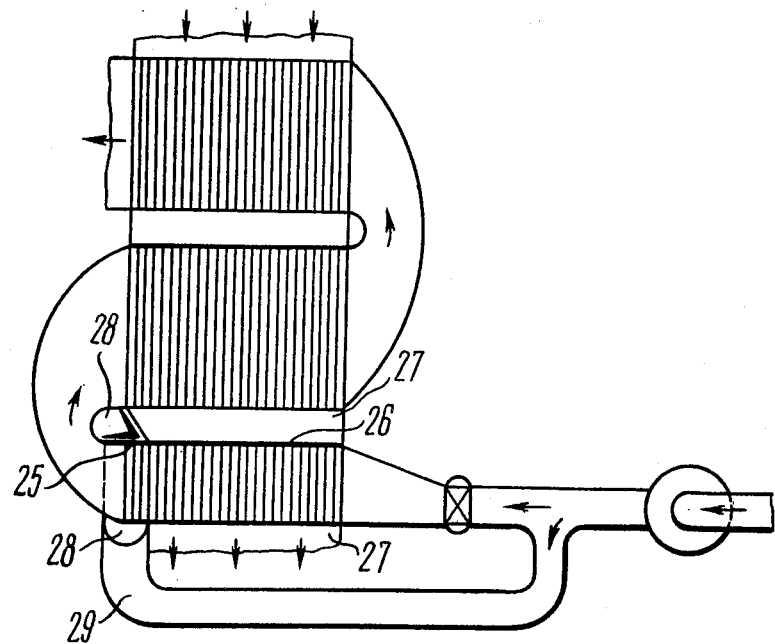
FIG. 5 is a schematic view illustrating the arrangement of the mixer inside the first pass of the air heater.

Finally, disclosed in the present invention is another feature contributing to the reduction of both the size and weight of the air heater which is that a bunch of frontal heating tubes of a respective pass of the air heater is used as the tubes of the mixer. As this can be seen in FIG. 5 schematically depicting said plan, a mixer 25 constitutes a portion of the bank of tubes of a first pass 26, a few frontal rows of the tubes of the first pass 26 being used as the tubes of the mixer 25. It will be noted that the cross section of gas ducts 27 is is reduced by a certain amount to accommodate headers 28 connected to an air feeding duct 29.

The air heater disclosed operates in the following way.

Figure 1:
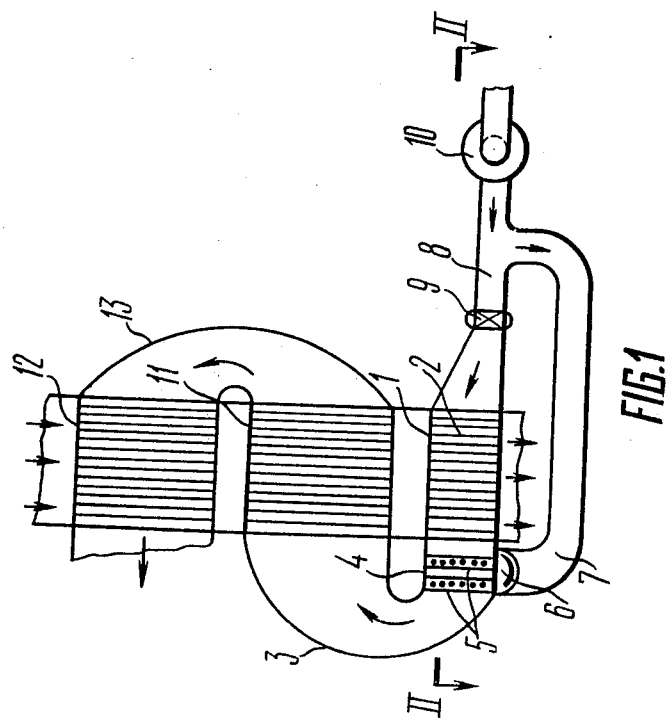
FIG. 1 is a schematic view of the air heater according to the invention.

Referring to FIG. 1, the blower 10 feeds cold air over the two feeding ducts 7 and 8 the smaller whereof, shown at 8, contains the means 9 of preheating wherein a fraction of the air is heated, say by steam, to a point sufficiently high to give the tubes 2 of the first pass 1, as it enters same, protection against corrosion, the temperature of said tubes at the inlet being higher than the dew point.

On absorbing further heat in the first pass 1, said fraction leaves same over the entire front of the heating tubes 2 being rather hot and enters the mixer 4 located in the air circulating duct 3 which connects the first pass 1 to the second one 11. As pointed out above, the tubing of the mixer 4 may constitute an integral part of the first pass 1 where the frontal part of the tubes is assigned to said duty (see FIG. 5). The rest of the cold air, i.e., its greatest part not admitted into the first pass 1, is introduced into the tubes 5 of the mixer 4 through the header 6 (or two headers as in FIG. 4) connected to the second air feeding duct 7 and leaves said tubes through the perforations, forming jets of cold air spreading into the flow of hot air at right angles thereto (see FIGS. 3 and 4). Since the tubes 5 of the mixer 4 are disposed over the entire frontal area of the first pass 1 and the transverse inflow of the jets of cold air is uniformly distributed along the height, the intermixing of said cold air with the hot one and the cooling of this latter air proceed effectively and are accomplished within a very short distance of one or two rows of the tubes without the need to increase the size of the air circulating duct 3. To enhance the uniformity at which the intermixing takes place, the adjacent tubes in the mixer are connected to different headers and blanked off at their opposite ends (see FIG. 4). As a result of highly effective and uniform mixing, the mixture of hot and cold air has the same temperature over the entire section of the air circulating duct 3, which temperature may be selected to be least possible to ensure protection of the second pass 11 against corrosion, but in any case not above the temperature of the preheated air.

Said features render the air heater not only a highly efficient apparatus but also one which gives reliable performance. The air leaving the second pass 11 is introduced into the third pass 12 by way of the next air circulating duct 12 and thence the hot air is admitted into the main item of the equipment which is the boiler, kiln and the like. Thus, the entire air heater is protected against corrosion, the means of preheating is compact and so is each of the mixers which are also simple while the air circulating ducts are conventional. At the same time, the thermal efficiency of the heater disclosed is high, for subject to the high-temperature preheating is just a fraction of the air and the temperature of the mixture of hot and cold air can be kept at the minimum allowable level.

The above description refers to air heaters with one stage of air inflow but it is applicable in full to air heaters employing more than one stage of air inflow.

What is claimed is:

1. A multipass corrosionproof air heater comprising banks of heating tubes arranged in separate passes series-connected on the airside, some of said passes being located inside a corrosive zone; air circulating ducts connecting the adjacent passes to each other; cold air feeding ducts one whereof contains a means of preheating a fraction of the cold air introduced into the first pass while the rest of said air feeding ducts are connected, by way of mixers of cold and hot air, to the circulating ducts which are located in that portion of the air heater which operates in the corrosive zone and serve to connect said portion to the rest of passes; said mixers of cold and hot air built into said air circulating ducts and consisting each of an array of parallel tubes perforated lengthwise, fitted along the front of the heating tubes forming the respective pass and connected to cold air headers communicating with the air feeding ducts.

2. A multipass corrosionproof air heater as claimed in claim 1, wherein perforations in tubes are provided to direct jets of cold air at right angles to the flow of hot air.

3. A multipass corrosionproof air heater as claimed in claim 1, wherein the adjacent perforated tubes of each mixer are blanked off at opposite ends while the other ends thereof are connected to cold air headers.

4. A multipass corrosionproof air heater as claimed in claim 1, wherein a bunch of the frontal heating tubes of a respective pass of the air heater is used as the tubes of the mixer.

* * * * *